No. 736,363. PATENTED AUG. 18, 1903.
I. CORNELIUSSEN.
MARINE ENGINE GOVERNOR.
APPLICATION FILED OCT. 25, 1901.
NO MODEL. 3 SHEETS—SHEET 2.
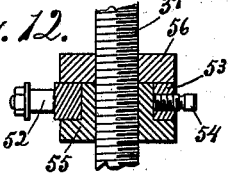
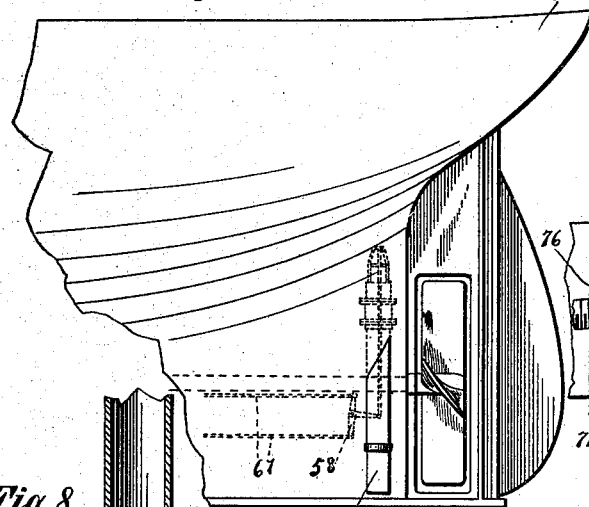
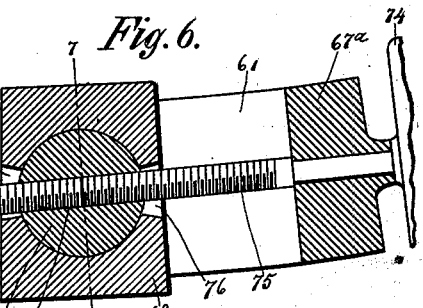
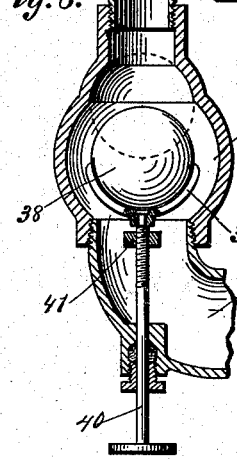
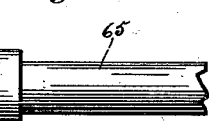
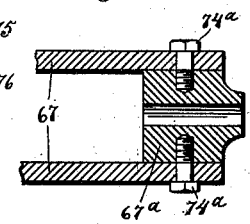
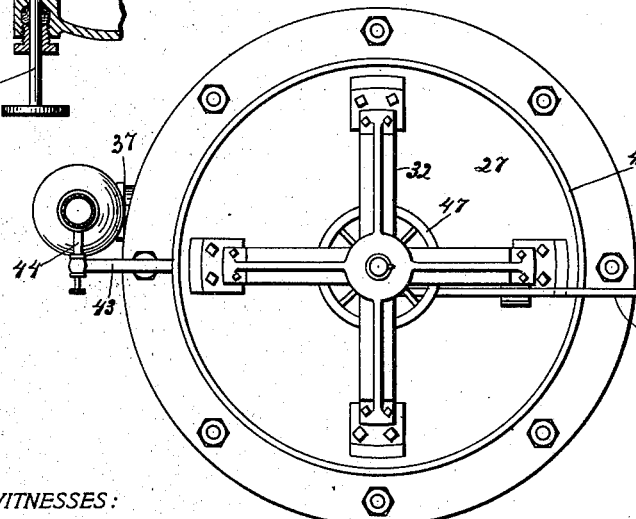
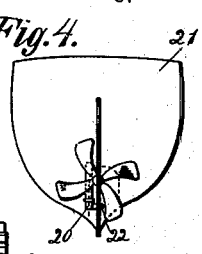
WITNESSES:
W. H. Cotton
Arthur Seibold
INVENTOR.
Ivar Corneliussen.
BY
Louis K. Gillson
ATTORNEY.
THE NORRIS PETERS CO., PHOTO-LITHO., WASHINGTON, D. C.

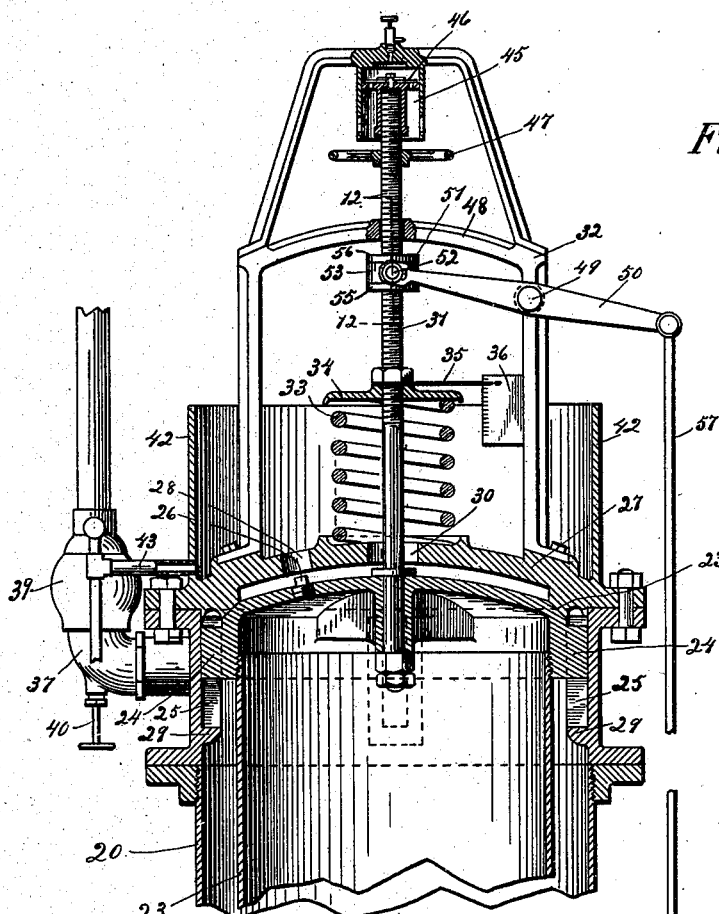

No. 736,363. PATENTED AUG. 18, 1903.
I. CORNELIUSSEN.
MARINE ENGINE GOVERNOR.
APPLICATION FILED OCT. 25, 1901.
NO MODEL.
3 SHEETS—SHEET 3.
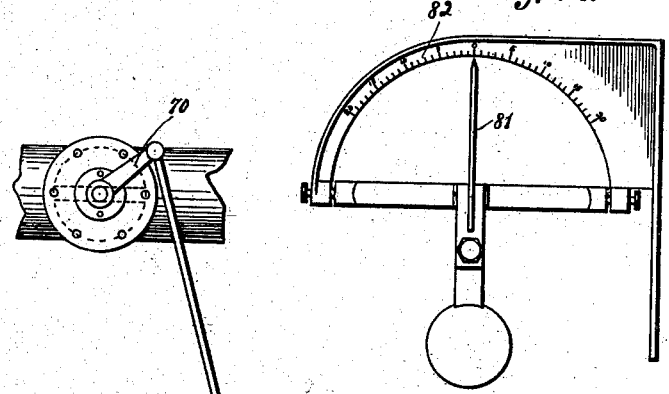
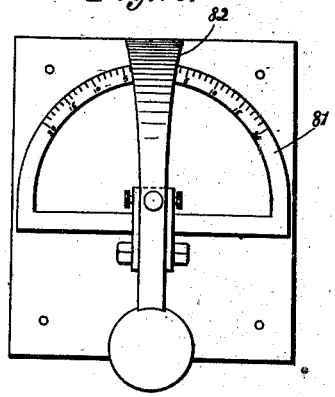
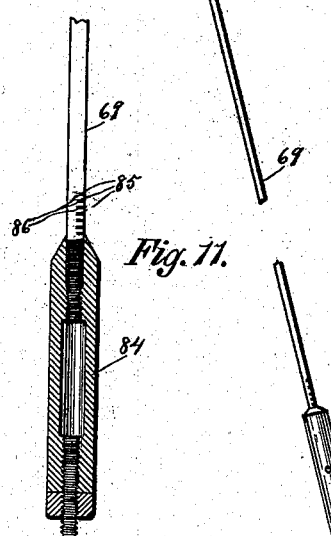
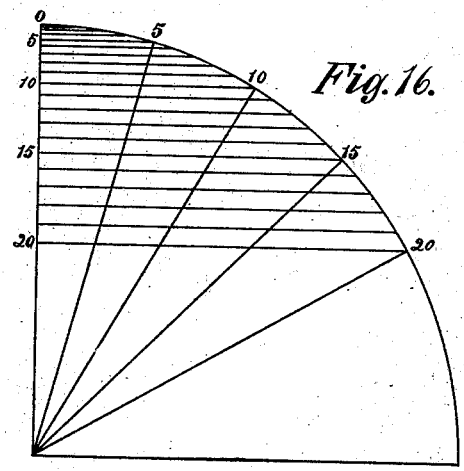
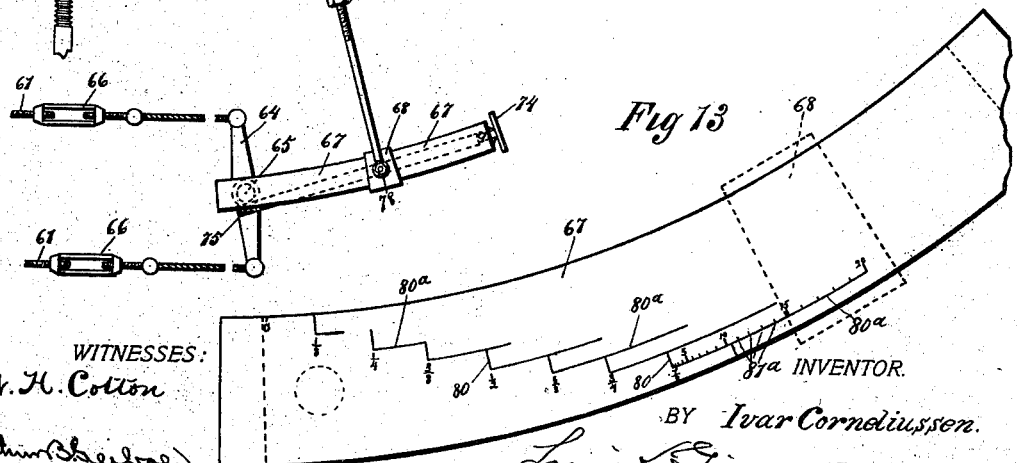
WITNESSES:
W. H. Cotton
Arthur B. Seebold
INVENTOR.
BY Ivar Corneliussen.
Louis K. Gieser ATTORNEY.
THE NORRIS PETERS CO., PHOTO-LITHO., WASHINGTON, D. C.

No. 736,363. Patented August 18, 1903.

UNITED STATES PATENT OFFICE.

IVAR CORNELIUSSEN, OF GALVESTON, TEXAS.

MARINE-ENGINE GOVERNOR.

SPECIFICATION forming part of Letters Patent No. 736,363, dated August 18, 1903.

Application filed October 25, 1901. Serial No. 80,010. (No model.)

*To all whom it may concern:*

Be it known that I, IVAR CORNELIUSSEN, a citizen of the United States, and a resident of Galveston, county of Galveston, and State of Texas, have invented certain new and useful Improvements in Marine-Engine Governors, of which the following is a specification and which are illustrated in the accompanying drawings, forming a part thereof.

This invention relates to a marine-engine governor which is designed to maintain uniformity of speed of the engine when the resistance to the propeller or propellers is varied by reason of the pitching or rolling motion of the vessel and to avoid what is technically known as "racing of the engine."

The invention comprises, essentially, a float or its equivalent located or projecting outside of the vessel, preferably at the stern near the propeller, and partially or wholly submerged in the water floating the vessel and buoyed to the level of the propeller or propellers thereof, means for controlling the steam-feed, connection between such means and the float whereby as the latter is lifted out of the water by the pitching or rolling of the vessel the connecting means are operated to vary the steam-feed according to variation in the resistance offered to the propeller, and means in the connection for adjusting the steam-controlling means.

The invention consists of the details, combination, and arrangement of parts hereinafter described, particularly designated in the claims, and which are shown in the accompanying drawings, in which—

Figure 1 is a vertical section of the governor, showing the float, the well-tube in which the float moves, and the spring for balancing with the water-pressure in the well the float. Fig. 2 is a detail of the connection between the governor and the means for controlling the steam-feed. Fig. 3 is a side, and Fig. 4 an end, elevation of the stern of a vessel, showing the governor in position. Fig. 5 illustrates other parts of the connection between the governor and the means for controlling the steam-feed. Fig. 6 is a vertical longitudinal section of the adjustable link connection shown in Fig. 5. Fig. 7 is a section, partially in full lines, on the line 7 7 of Fig. 6. Fig. 7ª relates to a detail of the link. Fig. 8 is a vertical section of the air-pipe leading to the float-tube or well shown in Fig. 1, and also the valve therefor and means for closing the same. Fig. 9 relates to a detail of the mechanism shown in Fig. 8. Fig. 10 is a plan view of the well or tube in which the governor-float is located. Fig. 11 is a detail of the rod connecting the link, seen in Fig. 5, with the auxiliary throttle-valve. Fig. 12 is a section on the line 12 12 of Fig. 1. Fig. 13 is an enlarged detail of the link of Fig. 5. Figs. 14 and 15 illustrate a trim-gage for indicating the degree of the pitch or roll of a vessel, and Fig. 16 is a diagram used for determining the scale for the link shown in Fig. 13.

Located in some convenient position, preferably at the stern of the vessel, and near the propeller thereof, in order that variations in the water-pressure at that point may be instantly responded to, is a tube 20, the lower end of which is submerged in and open to the water. As shown in Fig. 3, the upper end of the tube extends inside the hull of the vessel 21, and its lower end is provided with an elbow 22, extending through the dead-wood thereof. This arrangement locates the mouth of the tube 20 at a right angle to the direction of movement of the vessel to prevent water being forced into the tube and also provides for securely bracing the tube. These details, however, are immaterial.

The tube 20 provides a well for a float, which may consist of a closed tank or bucket 23, Fig. 1, or any equivalent having means for varying the weight thereof. The tank shown is provided with slides 24, playing in guides 25 on the inside of the well-tube 20, and also an opening in the top through which the tank is filled with water or other liquid or material and which is closed by a plug 26. The lower end of the well-tube is also provided with internal guides 20ª to steady the tank in its movement.

Bolted to the top of the tank 23 and rising vertically therefrom and passing through an aperture 30 in the top of the well-tube 20 is a rod 31, which is guided by a frame 32, bolted to the top of the well-tube.

When the tank 23 is in its normal position, it is elevated, as shown in Fig. 1, and seated against an annular flange 23ª on the under face of the top of the tube and is maintained in such position or balanced by the pressure of the water in the well 20 and a spring or an equivalent device. In the construction illustrated an expansion-spring 33 is employed, which encircles the rod 31 and reacts between the top of the well 20 and a nut-retained disk 34, screwed on the rod 31.

The tank 23 has a fixed maximum range of movement, and the tension of the spring is such that when the well 20 is empty and the tank full the latter is permitted to drop just far enough to close the engine-valve. This movement is defined by the top 27 of the well-tube and which has an opening 28 coinciding with the opening in the top of the tank 23 and stops 29 on the interior of the tube 20, the said stops being provided, however, merely to support the tank in case of breakage of the rod 31 or the spring 33, the operative movement of the tank being limited by the tension of the spring, as heretofore explained.

A pointer 35, secured in such manner as to move with the tank 23, as by clamping it between the nut and spring-retaining disk 34, and playing over a suitably-graduated scale 36, secured to the frame 32, is designed to indicate any variation in the balancing effect of the water in the well and the spring 33, as will be hereinafter referred to.

To supply air to the tube 20, which is practically air-tight when the tank is seated, to compensate for the rise and fall of water in the well due to the motion of the vessel or the waves, an elbowed pipe 37, opening into the well-tube, near the upper end thereof, and extending upwardly therefrom, is provided. This pipe has a float-valve 38, located in a chamber 39 and supported by a cage 39$^a$, carried by a stem 40, entering the elbow of and screwing through a web 41 in the pipe. Air may readily enter through the pipe; but in case water is washed or thrown into the same from the well-tube the valve 38 will be forced to its seat, immediately dropping back into the cage as the water recedes. When the governor is not in use, the valve is held to its seat by screwing up the stem 40.

The top of the well-tube 20 is provided with a vertical annular flange 42 to catch any water that may leak past the top of the tank 23 and through the openings 28 and 30 in the top of the well-tube 20, and a tube 43, leading through the flange, is designed to drain off such water and also any that may pass the valve 38 in the pipe 37, a tube 44 leading from the pipe above the valve-seat to the said tube 43.

If desired and in order to relieve the governor mechanism of shocks incident to a boisterous sea and to cushion the movement of the tank 23, a dash-pot 45 may be provided and secured to or formed, as shown, integral with the frame 32, in which dash-pot moves a plunger 46, secured to the upper end of the rod 31.

When the governor is not in use, as during calm weather or when the vessel is in port, the spring 33 may be relieved of the weight of the tank by a wheel 47 on the threaded rod 31 and which is designed to be screwed down against the cross-bars 48 of the frame 32.

Pivoted at 49 to the frame 32 is a lever 50, the inner end of which is provided with a slot 51, into which projects a boss 52 of a ring 53, Fig. 12, held by a set-screw 54 to the collar of a nut 55, screwed upon the rod 31. The ring 53 is clamped to the nut 55 by a nut 56, also screwed upon the rod 31.

To the outer end of the lever 50 there is pivotally connected a rod 57, which extends downwardly and wholly within the hull of the vessel to the shaft-tunnel, (shown in dotted lines in Fig. 4,) where it is connected to the end of a double bell-crank lever 58, Fig. 2, mounted on a rocker-shaft 59, journaled in any suitable manner transversely of the shaft-tunnel.

The cables 61 for communicating motion to the connecting mechanism hereinafter to be described might be connected directly to the ends of the crank-arms; but in order to compensate for variation in the movement of the tank 23 under certain circumstances, as will be more particularly referred to, and to insure uniform movement of the connecting mechanism the following means are suggested:

The arms of the bell-crank 58 are provided with apertured projections 60, in which is held a rod 62, the ends thereof being oppositely threaded and the intermediate portion formed to receive a wrench or other tool. In this construction the ends of the cables 61 are provided with threaded eyes 63, screwed upon the rod 62, so that rotation of the latter will simultaneously move the eyes toward or from each other, depending on the direction of rotation.

The cables 61 are led from the crank-arms through the shaft-tunnel to the engine-room, suitable sheaves (not shown) being provided for their guidance, and finally attached to the ends of a lever 64, Fig. 5, which is fixed intermediate of its ends on a rocker-shaft 65, the mounting for which is not shown. Turnbuckles, such as 66, are provided for the cables 61 for taking up slack. Also fixed to the shaft 65, so as to respond to the movement imparted thereto by the lever 64, is a pair of parallel curved link-bars 67, the adjacent ends of which are connected by crosspieces 67$^a$, and adapted to slide on the said link-bars is a block 68, having pivoted thereto a rod 69, connecting with the arm 70 of an auxiliary throttle-valve, Fig. 5, or with other mechanism controlling the steam-supply of the engine.

In the construction illustrated in Figs. 6 and 7 the block 68 is provided with a cylindrical transverse recess in which is seated, so as to be capable of oscillatory movement, a roller 71 and a pair of parallel longitudinal passages or recesses 73, through which the link-bars 67 pass. Journaled in the crosspiece 67$^a$, at the outer ends of the link-bars 67, and which is held by pivot-screws 74$^a$, is a threaded rod 75, having a hand-wheel 74 within easy reach of the engineer. This rod 75 is capable of rotary but not longitudinal movement, and passes through outwardly-flaring openings 76 in the opposite sides of the block 68 and also through a diametrical threaded aperture 72 of the roller 71. It will be evident that as the rod 75 is turned the block 68 will be moved back and forth on the link-bars 67, depending on the direction of rotation of the rod, the roller and the pivoted cross-piece 67ª adjusting themselves during the movement of the block to avoid binding. The rod 69 is connected to a stud 77, projecting from the block 68 and held thereon by a nut 78. The link-bars 67, through the medium of the rod 69, operate the auxiliary throttle-valve or other means for controlling the steam-supply to the engine, and as they have a fixed maximum range of travel the throw or movement of the valve will depend upon the position of the block 68 on the link-bars or its distance from the shaft 65.

The position of the auxiliary valve—that is, the extent of the opening afforded thereby—is regulated by means, such as the turnbuckle 84, for varying the length of the rod 69, and related graduations are provided on one of the link-bars 67 and this rod, as 85, for determining the adjustment of the parts.

Fig. 13 shows the link-bar scale. The link is first marked longitudinally with, say, eight equidistant graduations, as 80, each of which indicates the position to which the auxiliary valve should be set by adjustment of the turnbuckle 84 when the block 68 registers therewith in order that the valve may just close as the link-bars reach the limit of their downward movement; but inasmuch as the resistance of the tank 23 to the spring 33 will vary according to the inclination of the vessel, and the tank will thereby move as its weight overcomes the tension of the spring, a further adjustment of the block 68 is necessary, so as to insure uniformity of movement of the valve-rod 69. This supplementary adjustment is determined by a scale bearing a fixed relation to the angle of inclination of the vessel. The manner of securing the same will now be explained. The face of the link is divided transversely into eight equal parts, and the graduations 80 being stepped, as shown in Fig. 13, lines 80ª are drawn from the marks 80, concentric with the sides of the link-bar, increasing in length from "0" to "1," and each line is provided with the supplementary scale or minute subdivisions 81ª.

In Figs. 14 and 15 is shown a trim-gage, the scale 81 indicating the list and the scale 82 the pitch of a vessel. These scales are provided with arbitrary degree-marks on both sides of center from "0" to "20." A quarter of a circle is now drawn, Fig. 16, with a radius equal to the distance from "0" to "⅛" on the link-bar, and the arc thereof is divided into equal parts to correspond with the scale on the trim-gage, assuming twenty degrees to be the maximum list or pitch of a vessel. From each division on the arc a line is now drawn parallel with the horizontal radius line to the vertical radius, and the latter line will indicate the relative loss of movement due to the decreased resistance of the tank to the spring and the necessary further adjustment of the block on the link-bars in order to insure the closing of the valve when the vessel lists or pitches to the degree indicated and the propeller is out of the water. These graduations are transferred to the "⅛" line, 80ª, as shown. The other lines, 80ª, are also graduated in the same manner, a new diagram being layed off for each concentric line of the scale and the radius of the same being equal to the distance from the "0" to the concentric line being scaled. Of course it would not be desired to shut off the steam entirely, and in order to prevent the absolute closing of the valve supplementary indicating-marks 86 are placed on the rod parallel with the marks 85 to indicate the position of rest for the turnbuckle to provide the proper feed of steam to keep the engine running. This may, however, be provided for in the adjustment of the block 68.

The height of the water in the well 20 will depend on the draft of the vessel governed by her load. If, for instance, the vessel be entirely unloaded, the column of water will be greatly reduced, and it is necessary, therefore, in such case to reduce the weight of the tank 23, so that the pressure of the existing column of water and the spring will balance the tank—that is, keep it just seated. This is accomplished by pumping out sufficient water to permit the spring 33 to elevate the tank until the pointer 35 indicates "0," the pointer previously thereto having indicated by its position on the scale the excess of water; but when the water has been removed the tension of the spring 33 not being changed the weight of the tank, even if the latter were vertical, as when the vessel is on an even keel and is of sufficient length to ride several waves, will not be sufficient to entirely compress the spring when the water drops out of the well, so that the movement of the tank will not of itself be great enough to operate the connections sufficiently to shut off the steam-supply. This is provided for by adjusting the eyes 63 at the ends of the cables 61 outwardly on the threaded rod 62, so that decreased motion of the tank will be compensated for by an increase in the length of the arc described at the point of connection of the cables 61 with the crank-arms.

A scale having the same relative graduations as the scale 36 should be provided on one of the crank-arms to insure the proper adjustment of the cable connections relatively to the movement of the tank 23. This adjustment may, however, be provided by the block 68 on the link-bars, and instead of varying the weight of the tank by varying the quantity of water contained therein other means might be provided for accomplishing the same result, as by adjusting the tension of the spring 33.

The filling or emptying of the tank 23 depending on the draft of the boat and the adjustment of the cable connections on the lever 58 are attended to before leaving port, but the adjustment of the slide-block 68 on the link-bars 67 and of the turnbuckle 84 is made by the engineer in accordance with variations in the weather.

A sliding gate 22ª may be provided for the elbow 22 to close the well in case of accident to the governor or when for other reason the governor is not in service.

The operation is as follows: Assuming that the condition of the sea and the load of the vessel are such that the propeller is lifted entirely out of the water when the inclination of the vessel is fifteen degrees, as indicated by the scale 82 of the trim-gage, and that a seven-eighths opening of the auxiliary valve is desired, the valve is first given the proper opening by adjusting the turnbuckle on the rod 69, and the block 68 then moved to "15" on the seven-eighths concentric line 80ª. When thus adjusted, the valve will just close when the link-bars reach the limit of their downward movement, the adjustment of the block on the supplementary scale on the seven-eighths concentric line compensating for the lost motion of the tank 23 when the vessel is over on an angle of fifteen degrees. As the stern of the vessel rises the water rushes from the well 20, relieving the tank 23 of its pressure. Thereupon the tank overcomes the resistance of the spring 33, and through the medium of the connecting-rods, cables, and link-bars, which move with the shaft 65, the valve is gradually closed, or nearly so, depending on the position of the turnbuckle 84 on the scale 85. As the water again rises in the well the tank 23 is lifted and the auxiliary valve through the connections opened again.

It will be obvious that the position of the auxiliary valve will be from the maximum indicated by the scale to a minimum, depending on the adjustment of the turnbuckle on the rod 69. Preferably the well-tube 20 is located in advance of the propeller and in a plane parallel thereto, the upper end of the same extending to about the top of the wheel, as seen in Fig. 3. As thus arranged as soon as the propeller begins to rise out of the water the connections, responding to the movement of the tank 23, will as the water falls in the well gradually close the valve, so that the steam-feed will be proportioned to the varying resistance to the propeller.

I claim as my invention—

1. In a marine-engine governor, in combination, a vessel, a float of variable buoyancy, means supplemental to the water-pressure for buoying the float, steam-supply-controlling means, and connection between the said controlling means and the float.

2. In a marine-engine governor, in combination, a vessel, a valve for controlling the steam-supply to the engine thereof, a propeller, a float of variably buoyancy, means supplemental to the water-pressure for buoying the float, connection between the float and the valve, and means for varying the movement of the valve.

3. In a marine-engine governor, in combination, a vessel, means for controlling the steam-supply to the engine thereof, a propeller, a well, a float within the well and buoyed to the level of the propeller, connection between the float and the valve, and means in the connection for varying the movement of the steam-supply-controlling means.

4. In a marine-engine governor, in combination, a vessel, a float of variable buoyancy located at the stern of the vessel and adapted to be controlled by variation in the pressure of the water floating the vessel, means for maintaining with the water-pressure the buoyancy of the float, a valve, connection between the valve and the float, and means in the said connection to compensate for variation in the movement of the float.

5. In a marine-engine governor, in combination, a vessel, a float of variable buoyancy located at the stern of the vessel and adapted to be controlled by variation in pressure of the water floating the vessel, means for maintaining with the water-pressure the buoyancy of the float, a valve, a lever actuated by the float, connection between the lever and the valve, and means for adjusting the connection to compensate for variation in the movement of the float, and means for varying the movement of the valve.

6. In a marine-engine governor, in combination, a vessel, a well having an open bottom and located at the stern of the vessel, a tank in the said well and which is designed to be filled with an amount of water or other liquid depending on the existing draft of the vessel, a spring for maintaining with the water-pressure the equilibrium of the tank, a valve, and connection between the tank and the valve.

7. In a marine-engine governor, in combination, a vessel, a well-tube having an open bottom and located at the stern of and extending into the water floating the vessel, a movable tank located in the well, a spring for maintaining with the water-pressure in the well the equilibrium of the tank, the said tank being designed to be filled with water or other liquid and having an opening for filling or emptying the same, a valve, and connection responding to the movement of the tank for actuating the said valve.

8. In a marine-engine governor, in combination, a vessel, a well-tube located at the stern of the vessel and having its lower open end projecting into the water floating the vessel, a movable body located in the well-tube, a spring for maintaining with the water-pressure in the tube the equilibrium of the tank, the said tank being designed to be filled with water or other liquid and having an opening for filling or emptying the same, a valve, means responding to the movement of the tank for actuating the valve, and means for adjusting the movement of the actuating means to compensate for variation in the movement of the tank.

9. In a marine-engine governor, in combination, a vessel, a propeller, a well having an open bottom, a float within the well and buoyed at the level of the propeller, means for maintaining with the water-pressure in the well the buoyancy of the float, a valve, connection between the valve and the float, and adjusting means in said connection for varying the movement of the connection to compensate for variation in the movement of the tank.

10. In a marine-engine governor, in combination, a vessel, a well-tube located at the stern of and projecting into the water floating the vessel, a movable body in the well-tube, a spring for maintaining with the water-pressure in the well-tube the equilibrium of the movable body, a valve, a lever, a rod moved by the movable body and to which the lever is pivoted, a stem carried by the lever and provided with oppositely-threaded ends, eyes screwed upon the stem, a medially-pivoted lever, cables secured to the eyes and to the ends of the medially-pivoted lever, and connection between the latter lever and the valve.

11. In a marine-engine governor, in combination, a vessel, a float located at the stern of and normally resting in the water floating the vessel, a spring for maintaining with the water-pressure the buoyancy of the float, a valve, connection between the valve and the float, and adjusting means for varying the movement of the valve.

12. In a marine-engine governor, in combination, a vessel, a well-tube located at the stern of and projecting into the water floating the vessel, a float in the well-tube, a spring for maintaining with the water-pressure the buoyancy of the float, a rocker-shaft, connection between the float and the rocker-shaft, a pair of parallel link-bars fixed to the shaft, an adjustable block carried by the link-bars, a valve, a rod connecting the block and the valve, and means for adjusting the length of the rod to vary the movement of the valve.

13. In a marine-engine governor, in combination, a vessel, a well-tube located at the stern of and projecting through the hull thereof and into the water floating the vessel, the lower end of said tube being open, a movable body within the tube and the weight of which may be varied to correspond with variations in the draft of the vessel, a spring for maintaining with the water-pressure in the tube the equilibrium of the movable body, a dash-pot, connection between the dash-pot and the movable body, an air-tube entering the upper end of the well-tube, a float-valve for closing the opening, a valve for controlling the steam-supply, and connection between the latter valve and the movable body.

14. In a marine-engine governor, in combination, a vessel, a well passing through the hull of and into the water floating the vessel, a movable body located in the well, a spring for maintaining with the water-pressure the equilibrium of the movable body, a rocker-shaft, connection between the movable body and the rocker-shaft, a pair of parallel curved link-bars fixed to the rocker-shaft, a block adjustable on the link-bars, a valve, a rod connecting the block and the valve, and means for adjusting the length of the rod.

15. In a marine-engine governor, in combination, a vessel, a well having an open end and passing through the hull of and into the water floating the vessel, a movable body located in the well, a spring for maintaining with the water-pressure in the well the equilibrium of the movable body, a rocker-shaft, connection between the movable body and the rocker-shaft, a pair of parallel curved link-bars fixed to the rocker-shaft, a block adjustable on the link-bars, a transverse cylindrical recess in the block, a roller located in the recess and having a threaded diametrical aperture, a threaded rod carried by the link-bars and passing through the aperture of the roller, a hand-wheel for turning the threaded rod, a valve, a rod connecting the block and the valve, and a turnbuckle in the rod for varying the length of the same.

16. In a marine-engine governor, in combination, a vessel, a valve for controlling the steam-supply to the engine thereof, a propeller, a well having an open bottom, a float within the well, means for securing the float against movement, and connection between the float and the valve.

17. In a marine-engine governor, in combination, a vessel, a valve for controlling the steam-supply to the engine thereof, a propeller, a well having an open bottom, a float within the well and having a threaded rod fixed thereto, a guide through which the threaded rod passes, a hand-wheel on the threaded rod adapted to be screwed up against the guide for securing the float against movement, and connection between the float and the valve.

18. In a marine-engine governor, in combination, a vessel, a valve for controlling the steam-supply to the engine thereof, a propeller, a well having an open bottom, a float within the well, means for maintaining with the water-pressure the buoyancy of the float, a rocker-shaft, connection between the float and the rocker-shaft, an oscillating bar fixed to the shaft, a block slidable on the bar, a valve, and a rod connecting the block and the valve.

19. In a marine-engine governor, in combination, a vessel, a valve for controlling the steam-supply to the engine thereof, a propeller, a well having an open bottom, a float within the well, connection between the float and the valve, means for adjusting the connection to compensate for variation in the movement of the float, and means for varying the movement of the steam-supply-controlling means.

20. In a marine-engine governor, in combination, a vessel, a valve for controlling the steam-supply to the engine thereof, a propeller, a well having an open bottom, a float within the well, a rocker-shaft, connection between the float and the rocker-shaft, a bar fixed to the rocker-shaft, a rod connecting the bar with the steam-supply-controlling valve, and means for adjusting the length of the rod.

IVAR CORNELIUSSEN.

Witnesses:
ARTHUR B. SEIBOLD,
LOUIS K. GILLSON.